(12) United States Patent
Doelle

(10) Patent No.: US 8,082,796 B1
(45) Date of Patent: Dec. 27, 2011

(54) TEMPERATURE EXTRACTION FROM A PRESSURE SENSOR

(75) Inventor: Michael B. Doelle, Mountain View, CA (US)

(73) Assignee: Silicon Microstructures, Inc., Mountain View, CA (US)

(*) Notice: Subject to any disclaimer, the term of this patent is extended or adjusted under 35 U.S.C. 154(b) by 0 days.

(21) Appl. No.: 12/361,445

(22) Filed: Jan. 28, 2009

Related U.S. Application Data

(60) Provisional application No. 61/024,134, filed on Jan. 28, 2008.

(51) Int. Cl.
*G01L 19/04* (2006.01)
(52) U.S. Cl. ............................. 73/708; 73/723
(58) Field of Classification Search .................. None
See application file for complete search history.

(56) References Cited

U.S. PATENT DOCUMENTS

| | | | |
|---|---|---|---|
| 4,604,899 A * | 8/1986 | Yamada et al. .................. | 73/708 |
| 4,894,698 A * | 1/1990 | Hijikigawa et al. ............ | 257/254 |
| 4,965,697 A * | 10/1990 | Mosser et al. ............. | 361/283.1 |
| 5,336,943 A | 8/1994 | Kelly et al. | |
| 5,357,149 A | 10/1994 | Kimura | |
| 5,499,535 A | 3/1996 | Amano et al. | |
| 5,503,034 A | 4/1996 | Amano et al. | |
| 5,672,960 A | 9/1997 | Manaresi et al. | |
| 5,952,874 A | 9/1999 | Manaresi et al. | |
| 6,381,491 B1 * | 4/2002 | Maile et al. ....................... | 607/2 |
| 6,468,825 B1 | 10/2002 | Machida et al. | |
| 6,528,979 B2 * | 3/2003 | Kimura ......................... | 323/313 |
| 6,844,772 B2 | 1/2005 | Hoon et al. | |
| 7,127,368 B2 | 10/2006 | Choi | |
| 2003/0223877 A1 * | 12/2003 | Anstine et al. .................. | 417/18 |

OTHER PUBLICATIONS

Koelling, A., et al., "Design of a CMOS Temperature Sensor with Current Output;" *Sensors and Actuators*; 1990; vol. A21-A23; pp. 645-649.

Doelle, Michael, "Field Effect Transistor Based CMOS Stress Sensors," (topic of patent—Temperature Measurements Using Piezo-FETs); IMTEK, University of Frieburg; pp. 135-160.

* cited by examiner

*Primary Examiner* — Andre Allen
(74) *Attorney, Agent, or Firm* — Kilpatrick Townsend & Stockton LLP

(57) ABSTRACT

Circuits, methods, and systems to compensate pressure sensor readings for changes in temperature. An example measures temperature in a field-effect-transistor-based pressure sensor or micro-electromechanical system by measuring the device's threshold voltage. This threshold voltage is linearly dependent on the temperature but shows negligible sensitivity to mechanical stress. This allows the pressure sensor's temperature to be determined in an environment of changing pressure. Once the temperature is known, the pressure sensor's pressure readings can be adjusted. The threshold voltage can be extracted by measuring the turn-on transistor characteristic of the device and using device models. Alternately, the threshold voltage can be extracted using threshold voltage extraction circuits.

20 Claims, 5 Drawing Sheets

TEMPERATURE EXTRACTION FROM A PRESSURE SENSOR

CROSS-REFERENCES TO RELATED APPLICATIONS

This application claims the benefit of U.S. provisional patent application No. 61/024,134, titled TEMPERATURE EXTRACTION FROM A PRESSURE SENSOR, by Doelle, filed Jan. 28, 2008, which is incorporated by reference.

BACKGROUND

Pressure sensors have become ubiquitous the last several years and have found their way into many applications. These include medical applications, such as respiratory control and sleep-apnea treatment, and industrial applications, such as heating, venting, air conditioning (HVAC) and fire-protection systems.

These pressure sensors are typically formed on a silicon die having a diaphragm over a cavity, where the diaphragm is very thin and is supported by a sidewall or bulk region that forms the cavity. One or more mechanical stress sensors are located on the diaphragm. Pressure, either from above the diaphragm or below the diaphragm in the cavity, deflects the diaphragm and its mechanical stress sensors. From this deflection, pressure can be measured by utilizing the piezo-resistive effect of silicon. That is, as the sensors are stressed due to the bending of the diaphragm, the piezo-resistive effect changes the value of the conductive properties of the stress sensors. This change in conductive properties due to mechanical stress results in a change from which the pressure can be determined.

Unfortunately, conductive properties of the mechanical stress sensors may vary over temperature. Thus, temperature changes may appear as changes in pressure. Because of this, the performance of a pressure sensor may be limited by the ability to determine the temperature influence on its conductive properties.

Thus, what is needed are devices, methods, and systems that enable the measurement of the temperature of a pressure sensor in order to adjust pressure readings generated by the pressure sensor.

SUMMARY

Embodiments of the present invention provide circuits, methods, and apparatus for pressure sensors comprising of one or more field effect transistors (FETs), where the threshold voltage VT of the one or more FETs is used to extract the temperature at the location of the FETs. The extracted temperature is then used to adjust pressure sensor pressure readings generated using the one or more FETs or one or more other FETs.

Specifically, embodiments of the present invention employ one or more FETs are pressure sensors. These pressure sensors can be used to measure absolute or differential pressure variations. Changes in threshold voltage in these or other FETs are monitored, and from these threshold voltages the temperature of the pressure sensor is determined. The temperature is then used to calibrate or adjust the pressure sensor reading.

Various embodiments of the present invention may incorporate these and the other features described herein. A better understanding of the nature and advantages of the present invention may be gained by reference to the following detailed description and the accompanying drawings.

DESCRIPTION OF EXEMPLARY EMBODIMENTS

Figure 1:
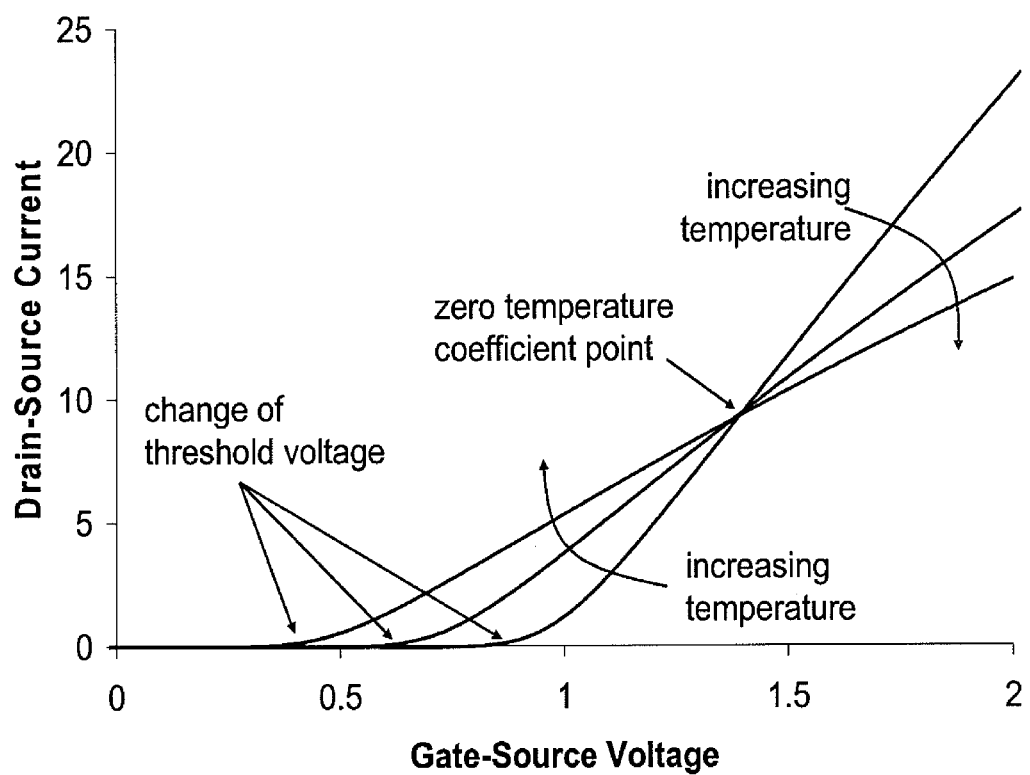
FIG. 1 is a diagram illustrating the influence of temperature on the transistor characteristics of a field effect transistor (FET)

FIG. 1 shows a diagram illustrating the influence of temperature on the transistor characteristics of a field effect transistor employed by pressure sensors according to embodiments of the present invention. Temperature changes effect both the slope of the IDS-VGS characteristic and the threshold voltage of the transistor. Specifically, the threshold voltage decreases with increasing temperature, while the slope of the IDS-VGS curves decreases with decreasing temperature. Once these effects are known, the temperature can be determined from the device operating point. In a specific embodiment of the present invention, this determination may be made by monitoring the drain-source current change at a fixed gate/source voltage. As can be seen by the curves, these measurements should be taken when the FET is operated outside the zero temperature coefficient point. For example, measurements of IDS may be taken at a VGS of 1 Volt. Increases in IDS correspond to increases in temperature. Alternately, measurements of IDS may be taken at a VGS of 2 Volts. At this condition, decreases in IDS correspond to increases in temperature.

The measurement of temperature is an important challenge in pressure sensor design. Temperature is not only an important environmental parameter, but it is also a dominant parasitic effect in almost any transducer. The significance of temperature sensitivity as a parasitic effect is particularly true for mechanical sensors that are based on silicon technologies. These difficulties are caused by the fact that most temperature transducing effects in silicon are inherently simultaneously sensitive to both variations of the applied mechanical signal (pressure) and the temperature. Thus, decoupling these two effects, pressure and temperature, in a sensor is of great importance.

Again, field effect transistors can be used to measure the mechanical stress in the diaphragm of a silicon pressure sensor. In addition, FETs have the advantage of providing more options in terms of electrical operating modes than conventional resistors that are typically used in Wheatstone bridge type silicon pressure sensors. An example showing how a FET is used to measure mechanical stress in accordance with an embodiment of the present invention is shown in the following figure.

Figure 2:
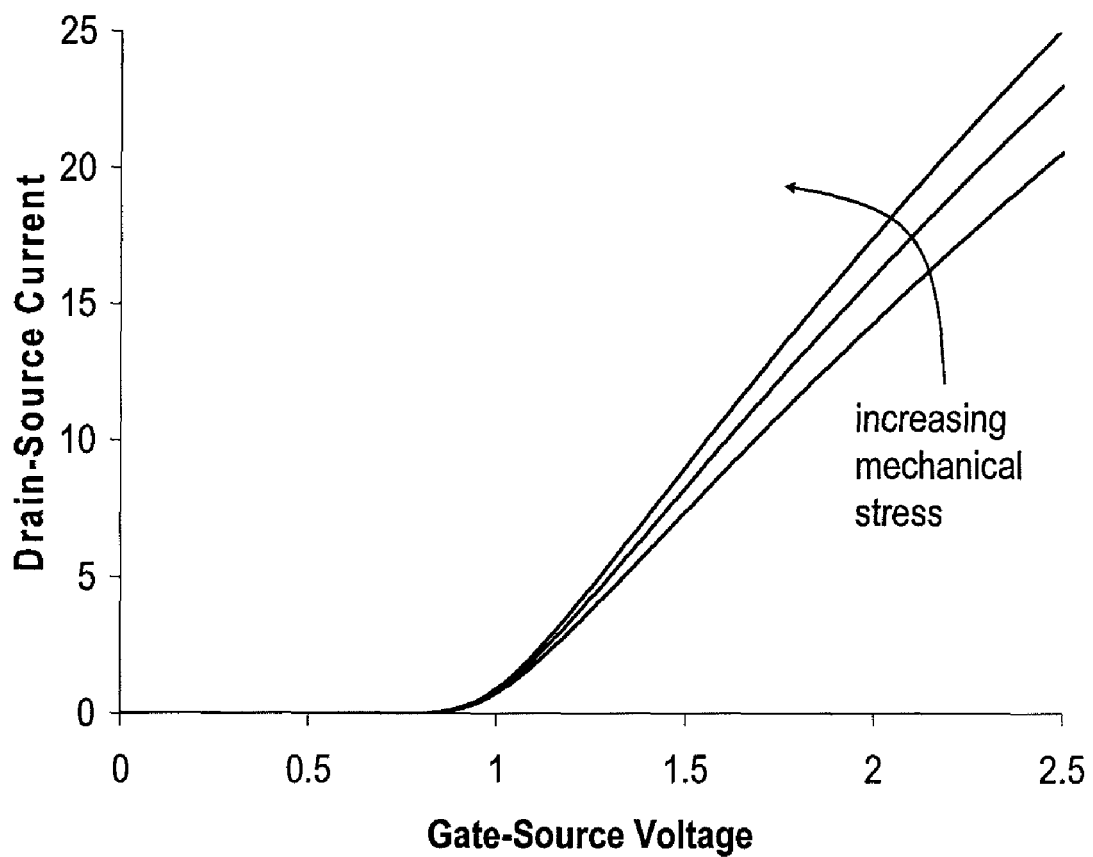
FIG. 2 is a diagram illustrating the influence of mechanical stress on the transistor characteristics of a field effect transistor.

FIG. 2 shows changes in the slope of the drain-to-source current IDS versus gate-to-source voltage VGS curve as a function of mechanical stress or pressure. Specifically, at a given VGS, IDS increases with increasing pressure. In many applications, it can be difficult to separate the changes in IDS caused by changes in pressure from changes in IDS caused by changes in temperature. This confusion may degrade the accuracy of a pressure measurement. This is because changes of the drain-to-source current due to temperature are not decoupled from changes of the drain/source current due to the applied pressure.

Accordingly, embodiments of the present invention determine pressure sensor temperature and use this determination to improve pressure sensor accuracy. A specific embodiment of the present invention uses changes in FET threshold voltage to measure temperature. An example of how this is done is shown in the following figure.

Figure 3:
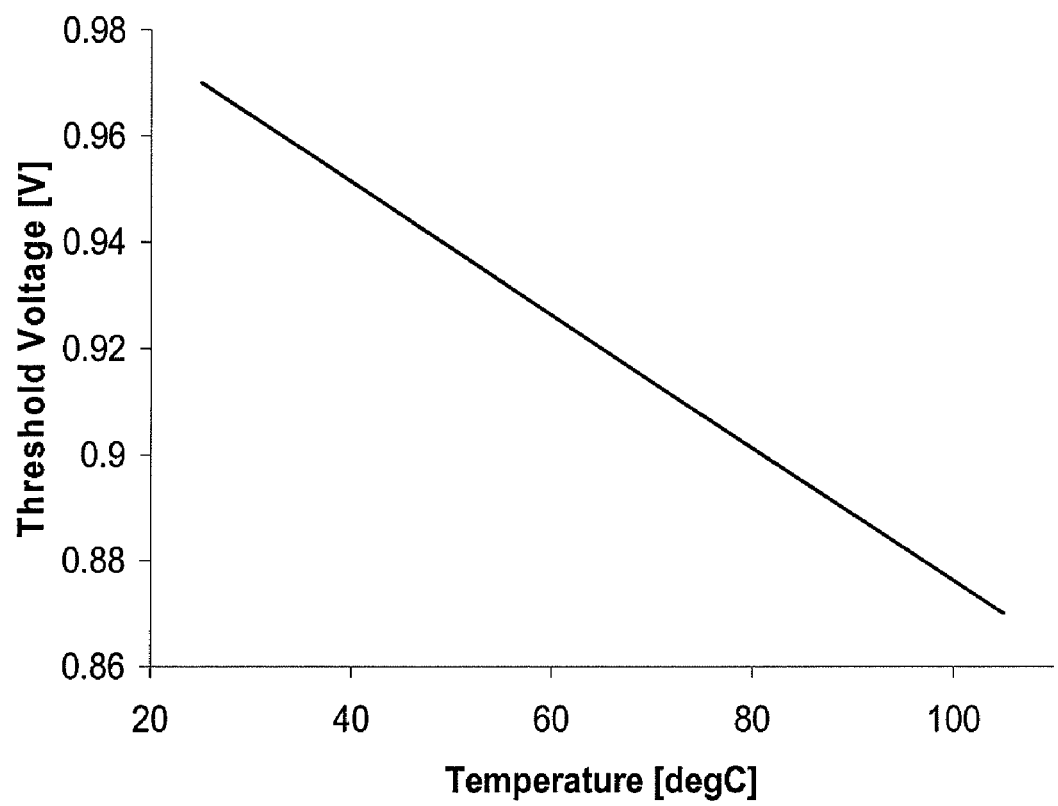
FIG. 3 illustrates changes in threshold voltage over temperature for a FET.

FIG. 3 illustrates the temperature dependence of the threshold voltage of a FET transistor. This figure shows that the threshold voltage is a strong linear function of temperature. Specifically, changes in the threshold voltage are typically in the order of −1 to −2 mV/K. However, the threshold voltage of the transistor is not a strong function of mechanical stress. Thus, embodiments of the present invention provide methods and devices to extract the temperature from a pressure sensor with minimal influence of mechanical stress on the temperature reading. This allows the use of a threshold voltage measurement to be used to determine temperature even in an environment of changing pressure. Thus, using an FET based pressure sensor, a method of using the threshold voltage for temperature measurements leads to a stress-compensated temperature signal. Using the temperature signal, a temperature compensated pressure signal can be obtained.

To improve performance, the field effect transistor can be located in close vicinity to the element used for extracting the primary mechanical load or pressure. Alternately, the identical element used to determine temperature may be used for extracting the primary mechanical load or pressure.

Various methods can be used to determine the threshold voltage VT in such a pressure sensor. First, VT can be determined by measuring the turn-on transistor characteristic of the FET and using device models to determine VT from these measurements. Alternately, VT can be extracted using threshold voltage extraction circuits. Such an extraction circuit may consist of a small number of individual FETs with only few of these FETs serving as the temperature sensitive element. The threshold voltage extraction circuit can be located on the pressure sensor die or on a second die containing only analog and/or digital circuitry.

Alternatively, the determination of the threshold voltage can be done externally in a data processing system, e.g., a computer, based on measurements performed on a simple pressure sensor with one FET as a stress sensing element. Typically, this procedure requires several measurement points on a source-drain current IDS versus gate-source voltage VGS curve.

An exemplary embodiment of the present invention includes circuitry to calculate or extract a threshold voltage from the stress sensing FET on the same chip as the FET. However, the circuitry can also be located on a second silicon chip that is connected to the pressure sensor only via metal interconnects, e.g., gold bond wires.

An additional advantage of using a FET based temperature sensor is that the integration into a system consisting of analog and digital components is rather straightforward. Analog signal-conditioning components are, e.g., the amplification of the signals coming from the pressure sensor. This amplified signal may then be converted to the digital domain for further processing, e.g., by using digital linearization techniques and methods of decoupling the pressure dependent signal from its temperature sensitivity.

For example, the pressure sensor including the temperature extraction element can be fabricated on a different silicon die than the analog/digital conditioning circuit. The sensor and the conditioning circuit may be connected on an external substrate or, as mentioned above, directly connected through, e.g., bond wires. The external substrate can be a printed circuit board (PCB), a ceramic hybrid, or the lead frame of a plastic package or any other interconnecting substrate used in electronics. Alternately, the pressure sensor including the temperature extraction element can be fabricated in the same standard silicon process with some additional process steps required to create the pressure sensing element. A block diagram of an example pressure sensor including temperature compensation according to an embodiment of the present invention is shown in the following figure.

Figure 4:
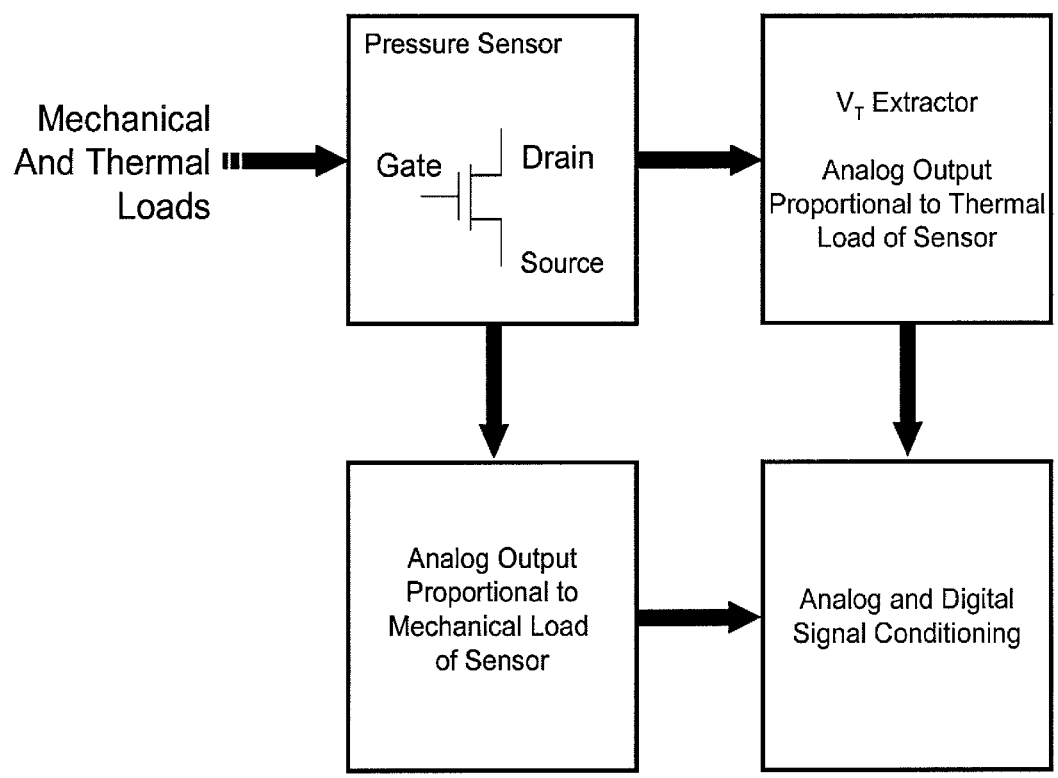
FIG. 4 is a schematic diagram of the pressure sensor in a system with analog and digital signal conditioning circuitry according to an embodiment of the present invention.

FIG. 4 shows a schematic of functional blocks that may be used to obtain the temperature-compensated pressure signal from an FET based pressure sensor. Mechanical and thermal loads to the pressure sensor change the threshold voltage and pressure output of the FET. The threshold voltage extractor generates a stress-compensated temperature signal by measuring a threshold voltage of the FET. A pressure signal can be obtained. The pressure signal can be temperature compensated by the analog and digital signal conditioning circuit. The analog and digital signal conditioning circuit may include analog and digital circuit components.

While in this example, the threshold voltage extractor measures a threshold voltage and generates a temperature signal, in other embodiments of the present invention these various functions may be allocated among these or other circuit blocks in different ways. For example, in a specific embodiment of the present invention, the threshold voltage extractor measures a threshold voltage and provides it to the analog and digital signal conditioning circuit, which then generates a temperature signal. An exemplary arrangement of the individual components on a silicon die is shown in the following figure.

Figure 5:
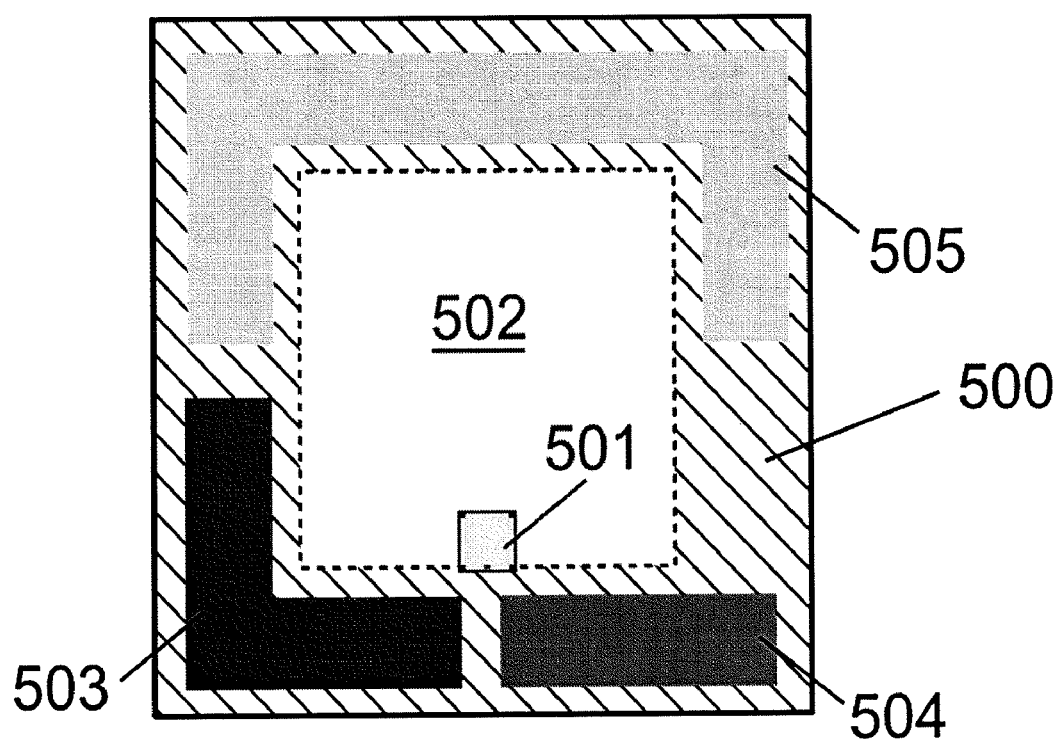
FIG. 5 is a schematic drawing of the silicon pressure sensor showing an exemplary arrangement of the components on a silicon die.

FIG. 5 shows a silicon pressure sensor die 500 having a thin diaphragm 502 and a field effect transistor type mechanical stress sensor 501 located at the edge of the diaphragm. The thin diaphragm 502 is surrounded by a thicker portion of the silicon. The FET 501 is connected to the pressure signal extraction circuit 503 and the threshold voltage extraction circuit 504. Both circuits 503 and 504 are connected to an analog and/or digital signal conditioning circuit 505.

In various embodiments of the present invention, one or more of the FETs may have two, or more than two, source-drain regions and corresponding terminals. They may also have one or more than one, gate regions. More information on the possible devices may be found in co-pending U.S. patent application Ser. No. 12/184,159, titled Sensor Element Placement for Package Stress Compensation, by Doelle et al., filed Jul. 31, 2008, which is incorporated by reference.

Again, one or more FETs may be used to determine both temperature and pressure. By using the same FET or FETs, the present invention enables the fabrication of very small pressure sensors because only one circuit structure is required to extract both physical quantities, i.e., pressure and temperature. This is advantageous both from a cost perspective and because it enables the use of these sensors in applications requiring ultra-small footprints.

Another advantage is that the temperature signal can be used to compensate temperature influence on the mechanical signal with very high accuracy because the spatial distance between temperature read-out and the mechanical signal is practically zero. Further, the measured temperature is the temperature of the surrounding medium (gas, liquid). This information is useful in many pressure sensor applications.

In addition, low pressure sensors are characterized by the extremely thin diaphragm and accordingly low heat capacity. Thus, the response time of a sensor according to an embodiment of the present invention to temperature variations is typically improved because the temperature sensor is located on a thin membrane with a thermal capacity much smaller than that of a bulk silicon device. That is, the temperature of the diaphragm follows the surrounding media with minimum time lag. To ensure improved performance, an embodiment of the present invention locates the temperature measurement circuitry near the diaphragm and the mechanical stress sensor to reduce measurement errors. In a specific embodiment of the present invention, the mechanical stress sensor and the temperature sensor are one identical device located on the diaphragm.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A pressure sensor comprising:
    a field effect transistor;
    a threshold voltage extractor coupled to the field effect transistor to generate a temperature signal; and
    a conditioning circuit coupled to the field effect transistor and coupled to receive the temperature signal, where the conditioning circuit uses the temperature signal to adjust a pressure reading provided by the field effect transistor.

2. The pressure sensor according to claim 1 wherein the field effect transistor has more than two source-drain terminals.

3. The pressure sensor according to claim 2 wherein the field effect transistor has more than one gate terminal.

4. The pressure sensor according to claim 1 wherein the threshold voltage extractor circuit extracts the temperature by determining the threshold voltage of the field effect transistor.

5. The pressure sensor according to claim 1 wherein the field effect transistor is integrated with the threshold voltage extractor and the conditioning circuit onto a single die.

6. The pressure sensor according to claim 1 wherein the field effect transistor is located on a first die and the conditioning circuit is located on a second die.

7. A method of measuring pressure comprising:
    measuring a threshold voltage of a field effect transistor;
    using the threshold voltage to determine a temperature;
    reading a pressure;
    using the temperature to adjust the pressure reading; and
    providing the adjusted pressure reading.

8. The method of claim 7 wherein the threshold voltage is extracted by measuring the turn-on transistor characteristic of the field effect transistor.

9. The method of claim 7 wherein the threshold voltage is extracted using a threshold voltage extraction circuit.

10. The method of claim 7 wherein the pressure is read using the field effect transistor.

11. The method of claim 7 wherein the pressure is read using a second field effect transistor.

12. The pressure sensor according to claim 7 wherein the field effect transistor has more than two source-drain terminals.

13. The pressure sensor according to claim 12 wherein the field effect transistor has more than one gate terminal.

14. An integrated circuit comprising:
    a field effect transistor;
    a threshold voltage extractor to provide a gate-to-source voltage to the field effect transistor and to measure a resulting drain-to-source current to determine a threshold voltage of the field effect transistor, and to generate a temperature reading using the threshold voltage;
    a pressure measuring circuit to provide a pressure reading; and
    a conditioning circuit to receive the temperature and the pressure reading and to provide an adjusted pressure reading.

15. The integrated circuit of claim 14 wherein the pressure measuring circuit provides a gate-to-source voltage to the field effect transistor and measures a resulting drain-to-source current to generate the pressure reading.

16. The integrated circuit of claim 14 wherein the conditioning circuit receives the threshold voltage and determines a temperature using the threshold voltage.

17. The integrated circuit of claim 16 wherein the threshold voltage extractor uses the temperature to generate an adjusted pressure reading.

18. The integrated circuit of claim 14 wherein the field effect transistor is located on a diaphragm.

19. The pressure sensor according to claim 14 wherein the field effect transistor has more than two source-drain terminals.

20. The pressure sensor according to claim 19 wherein the field effect transistor has more than one gate terminal.

* * * * *